(12) United States Patent
Kim et al.

(10) Patent No.: US 10,846,507 B2
(45) Date of Patent: Nov. 24, 2020

(54) APPARATUS FOR RECOGNIZING PRESSURE AND ELECTRONIC APPARATUS INCLUDING THE SAME

(71) Applicant: SAMSUNG ELECTRONICS CO., LTD., Suwon-si (KR)

(72) Inventors: Jinmyoung Kim, Hwaseong-si (KR); Byungkyu Lee, Seoul (KR); Dongkyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 139 days.

(21) Appl. No.: 16/010,660

(22) Filed: Jun. 18, 2018

(65) Prior Publication Data

US 2018/0365465 A1    Dec. 20, 2018

(30) Foreign Application Priority Data

Jun. 19, 2017   (KR) ........................ 10-2017-0077587

(51) Int. Cl.
*G06K 9/00*    (2006.01)
*G06F 3/044*    (2006.01)
*G06F 3/041*    (2006.01)

(52) U.S. Cl.
CPC ............. *G06K 9/001* (2013.01); *G06F 3/044* (2013.01); *G06F 3/0414* (2013.01); *G06F 3/0416* (2013.01); *G06K 9/0002* (2013.01); *G06K 9/0004* (2013.01); *G06K 9/0008* (2013.01); *G06K 9/00013* (2013.01)

(58) Field of Classification Search
None
See application file for complete search history.

(56) References Cited

U.S. PATENT DOCUMENTS

| | | | |
|---|---|---|---|
| 8,326,004 B2 | 12/2012 | Lee et al. | |
| 9,098,188 B2 * | 8/2015 | Kim | .................... G06F 3/04812 |
| 9,602,729 B2 * | 3/2017 | King | ................... G06K 9/00624 |
| 9,626,030 B2 | 4/2017 | Lee et al. | |
| 9,785,305 B2 * | 10/2017 | Alonso Ruiz | ......... G06F 3/0484 |
| 9,921,668 B1 * | 3/2018 | Chadda | ................... G06F 3/041 |
| 10,078,442 B2 * | 9/2018 | Bernstein | ............ G06F 3/04842 |

(Continued)

FOREIGN PATENT DOCUMENTS

CN   104834380 A   *   8/2015
CN   05677082   *   6/2016

(Continued)

OTHER PUBLICATIONS

Communication dated Nov. 8, 2018 issued by the European Patent Office in counterpart European Patent Application No. 18178424.0.

(Continued)

*Primary Examiner* — Andrae S Allison
(74) *Attorney, Agent, or Firm* — Sughrue Mion, PLLC

(57) ABSTRACT

A pressure recognition apparatus is provided and includes a fingerprint sensor including a touch surface touchable by a user, the fingerprint sensor being configured to sense a fingerprint of the user input to the touch surface; and a processor configured to determine an intensity of a pressure applied to the touch surface from fingerprint information sensed by the fingerprint sensor.

21 Claims, 10 Drawing Sheets

(56) References Cited

U.S. PATENT DOCUMENTS

| | | | |
|---|---|---|---|
| 2006/0078174 A1* | 4/2006 | Russo | G06F 3/0414 382/121 |
| 2010/0066697 A1* | 3/2010 | Jacomet | G06F 3/0414 345/173 |
| 2013/0285977 A1* | 10/2013 | Baharav | G06F 3/0414 345/174 |
| 2015/0036065 A1 | 2/2015 | Yousefpor et al. | |
| 2015/0185958 A1* | 7/2015 | Park | G06F 3/0416 345/175 |
| 2016/0070404 A1 | 3/2016 | Kerr et al. | |
| 2016/0110581 A1 | 4/2016 | Heo et al. | |
| 2016/0299615 A1* | 10/2016 | Schwarz | G06F 3/01 |
| 2016/0299628 A1* | 10/2016 | Ribeiro | G06F 3/0414 |
| 2016/0357391 A1* | 12/2016 | Nilo | G06F 3/0416 |
| 2018/0032783 A1 | 2/2018 | Wu et al. | |

FOREIGN PATENT DOCUMENTS

| | | | |
|---|---|---|---|
| CN | 105677082 A | | 6/2016 |
| CN | 106537415 A | * | 3/2017 |
| CN | 106537415 A | | 3/2017 |
| EP | 3273329 A1 | | 1/2018 |
| JP | 2010-521759 A | | 6/2010 |
| KR | 10-1474733 B1 | | 12/2014 |
| KR | 10-2016-0069357 A | | 6/2016 |
| KR | 10-2017-0017842 A | | 2/2017 |
| WO | 2017/031841 A1 | | 3/2017 |

OTHER PUBLICATIONS

Communication dated Jul. 16, 2020 issued by the European Patent Office in European Application No. 18 178 424.0—1207.

* cited by examiner

APPARATUS FOR RECOGNIZING PRESSURE AND ELECTRONIC APPARATUS INCLUDING THE SAME

CROSS-REFERENCE TO RELATED APPLICATION

This application claims priority from Korean Patent Application No. 10-2017-0077587, filed on Jun. 19, 2017, in the Korean Intellectual Property Office, the disclosure of which is incorporated herein in its entirety by reference.

BACKGROUND

1. Field

Apparatuses and methods consistent with exemplary embodiments relate to a pressure recognition apparatus capable of recognizing a pressure applied when a fingerprint is input, and an electronic apparatus including the pressure recognition apparatus, and a method thereof.

2. Description of the Related Art

The need for personal authentication using unique personal characteristics such as fingerprints, voice, face, hands, irises, or the like has been gradually increasing. Personal authentication is typically used in banking devices, access control systems, mobile devices, laptop computers, etc., and recently, with the widespread use of mobile devices like smartphones, fingerprint sensors for personal authentication has been adopted to protect the large amounts of security information stored in smartphones.

An apparatus including a fingerprint sensor, for example, a smartphone, may include applications driven by a pressure applied during a touch, and thus a pressure sensor is needed.

Examples of an existing pressure sensor include a pressure sensor that determines a bending degree of a sensor according to an applied pressure as a resistance variation. This type of pressure sensor is based on the premise that a display is bent by a pressure of a finger, and thus is not easy to apply when display glass is thick.

SUMMARY

One or more exemplary embodiments may provide are electronic apparatuses capable of recognizing a pressure applied during a fingerprint input.

Additional exemplary aspects and advantages will be set forth in part in the description which follows and, in part, will be apparent from the description, or may be learned by practice of the presented exemplary embodiments.

According to an aspect of an exemplary embodiment, a pressure recognition apparatus includes a fingerprint sensor including a touch surface touchable by a user, the fingerprint sensor being configured to sense a fingerprint of the user input to the touch surface; and a processor configured to determine an intensity of a pressure applied to the touch surface based on sensed fingerprint information sensed by the fingerprint sensor.

The pressure recognition apparatus may further include a memory, wherein reference fingerprint information of the user is stored in the memory.

The processor may be further configured to extract, from the reference fingerprint information, a reference profile representing a feature of the fingerprint of the user.

The processor may be further configured to extract, from the reference fingerprint information, a reference height profile comprising a reference ridge/valley height distribution of the fingerprint of the user.

The processor may be further configured to extract, from the reference fingerprint information, a plurality of reference height profiles respectively matched with touch states.

The processor may be further configured to extract, from the sensed fingerprint information, a sensed height profile comprising a sensed ridge/valley height distribution of the fingerprint of the user.

The processor may be further configured to calculate the intensity of the pressure applied to the touch surface based on a comparison of the reference height profile and the sensed height profile.

The processor may be further configured to extract, from the reference fingerprint information, a reference contrast profile comprising a contrast of a fingerprint image of the fingerprint of the user.

The processor may be further configured to extract, from the reference fingerprint information, a plurality of reference contrast profiles respectively matched with touch states.

The processor may be further configured to extract, from the sensed fingerprint information, a sensed contrast profile of a fingerprint image.

The processor may be further configured to calculate the intensity of the pressure applied to the touch surface based on a comparison of the reference contrast profile and the sensed contrast profile.

The fingerprint sensor may be a capacitance-type sensor.

The fingerprint sensor may be an optical sensor.

According to an aspect of another exemplary embodiment, an electronic apparatus includes a fingerprint sensor including a touch surface touchable by a user, the fingerprint sensor being configured to sense a fingerprint of the user input to the touch surface; a memory configured to store an application module that uses an intensity of a pressure input by the user as a parameter, and a pressure calculation module that calculates the intensity of a pressure applied to the touch surface based on sensed fingerprint information sensed by the fingerprint sensor; and a processor configured to execute the application module and the pressure calculation module.

The electronic apparatus may further include a display panel controlled by the processor and configured to provide an execution screen of the application module.

The touch surface of the fingerprint sensor may be disposed on a display surface of the display panel.

Reference fingerprint information of the user may be stored in the memory.

The memory may further store a reference height profile comprising a reference ridge/valley height distribution of the fingerprint of the user.

The pressure calculation module may include command for extracting, from the sensed fingerprint information, a sensed height profile comprising representing a sensed ridge/valley height distribution of the fingerprint of the user and comparing the reference height profile with the sensed height profile.

The memory may be further configured to store a reference contrast profile comprising a contrast of a fingerprint image.

The pressure calculation module may include command for extracting, from the sensed fingerprint information, a sensed contrast profile of the fingerprint image and comparing the reference contrast profile with the sensed contrast profile.

BRIEF DESCRIPTION OF THE DRAWINGS

These and/or other exemplary aspects will become apparent and more readily appreciated from the following description of the exemplary embodiments, taken in conjunction with the accompanying drawings in which.

DETAILED DESCRIPTION

Figure 1:
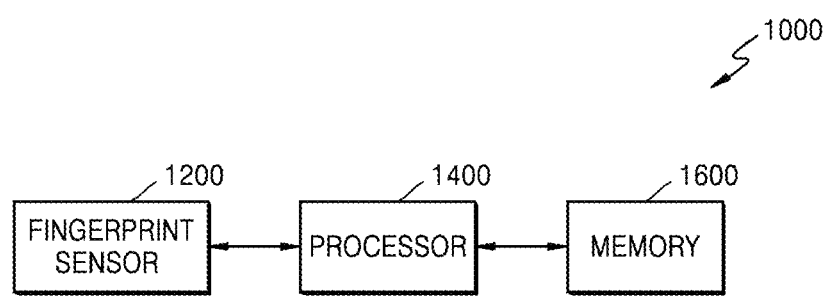
FIG. 1 is a schematic diagram of a structure of a pressure recognition apparatus according to an exemplary embodiment.

Exemplary embodiments will now be described more fully with reference to the accompanying drawings. Like reference numerals in the drawings denote like elements, and, in the drawings, the sizes of elements may be exaggerated for clarity and for convenience of explanation. In this regard, the exemplary embodiments may have different forms and should not be construed as being limited to the descriptions set forth herein.

It will be understood that when a layer is referred to as being "on" another layer or substrate, it can be directly on the other layer or substrate, or intervening layers may also be present.

While such terms as "first", "second", etc., may be used to describe various components, such components must not be limited to the above terms. The above terms are used only to distinguish one component from another.

An expression used in the singular encompasses the expression in the plural, unless it has a clearly different meaning in the context. The terms "comprises" and/or "comprising" or "includes" and/or "including" when used in this specification, specify the presence of stated elements, but do not preclude the presence or addition of one or more other elements.

In addition, terms such as " . . . unit", " . . . module", or the like refer to units that perform at least one function or operation, and the units may be implemented as hardware or software or as a combination of hardware and software.

Figure 2:
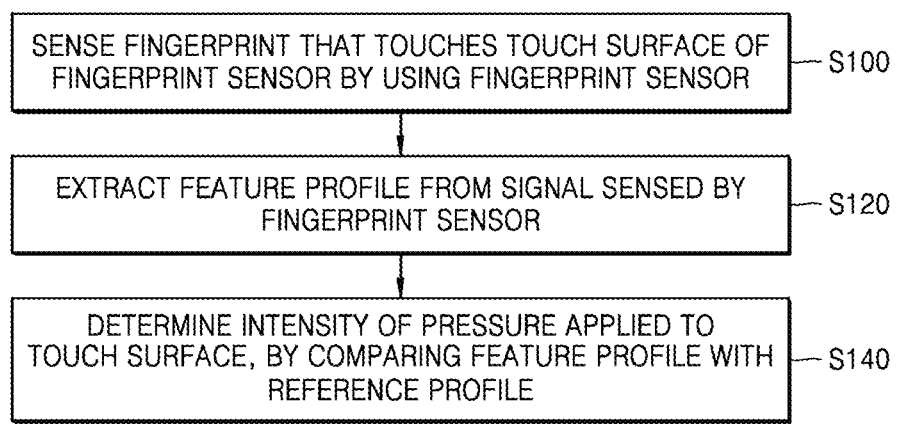
FIG. 2 is a flowchart of a pressure recognition method according to an exemplary embodiment.

FIG. 1 is a schematic diagram of a structure of a pressure recognition apparatus 1000 according to an exemplary embodiment. FIG. 2 is a flowchart of a pressure recognition method according to an exemplary embodiment.

Referring to FIG. 1, the pressure recognition apparatus 1000 includes a fingerprint sensor 1200 that senses a fingerprint of a user, and a processor 1400 that determines the intensity of pressure used for the fingerprint input from information sensed by the fingerprint sensor 1200 and a signal output therefrom.

The pressure recognition apparatus 1000 may determine the intensity of the pressure by using the fingerprint sensor 1200. In other words, when a fingerprint of a user is input by the user touching a touch surface of the fingerprint sensor 1200, the pressure recognition apparatus 1000 may determine the intensity of a pressure applied to the touch surface by using information obtained by the fingerprint sensor 1200.

The pressure recognition apparatus 1000 may further include a memory 1600, in which fingerprint information of the user may be pre-stored. The processor 1400 may extract, in advance, a reference profile representing features of the fingerprint information of the user to determine the pressure intensity, and may store the extracted reference profile in the memory 1600. The reference profile may be, for example, a fingerprint ridge/valley height profile or a contrast profile representing a black/white ratio of a fingerprint image. These features may be expressed as different profiles according to pressures with which the user inputs his or her fingerprint. Accordingly, the processor 1400 may extract one or a plurality of reference profiles matched with touch states related to the stored fingerprint information.

An execution program to be used when the processor 1400 determines the pressure intensity may be stored in the memory 1600. That is, the processor 1400 may determine the pressure intensity by executing the program stored in the memory 1600.

Pressure recognition performed by the pressure recognition apparatus 1000 will now be described with reference to FIG. 2.

First, in operation S100, the fingerprint sensor 1200 senses the fingerprint that touches the touch surface of the fingerprint sensor 1200. The information sensed by the fingerprint sensor 1200 may be a capacitance variation according to a fingerprint ridge/valley height or reflected light from the fingerprint, according to types of fingerprint sensors. Thus, the signal output from the fingerprint sensor may include information of a value of a position within a touched area.

Next, in operation S120, the pressure recognition apparatus 1000 extracts a feature profile from the sensed signal. The feature profile may be any profile as long as it is able to represent an output value that varies according to pressure. For example, the feature profile may be, but is not limited to, the fingerprint ridge/valley height profile, or the contrast profile of the fingerprint image.

Then, in operation S140, the pressure recognition apparatus 1000 determines the intensity of the pressure applied to the touch surface, by comparing the feature profile with the reference profile. The reference profile is extracted from the pre-stored fingerprint information of the user, and serves as a reference to be compared to the feature profile extracted from the signal sensed by the fingerprint sensor. The reference profile may be extracted in advance and stored in the memory 1600, together with the fingerprint information of the user.

Figure 3:
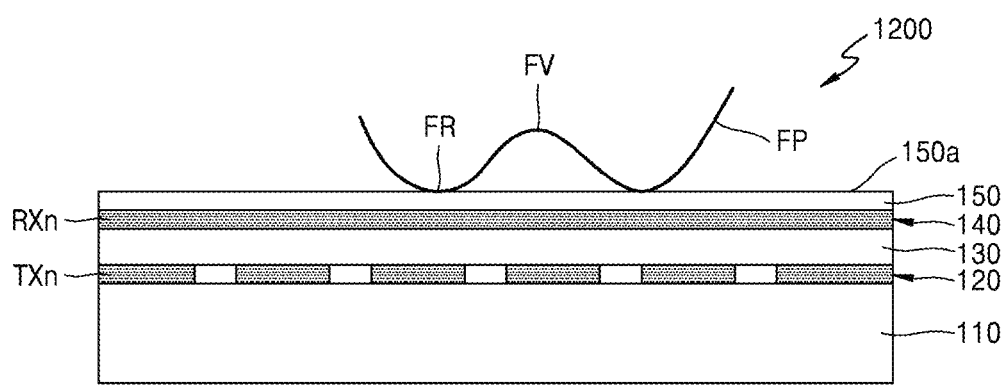
FIG. 3 is a cross-sectional view illustrating an exemplary structure of a fingerprint sensor employed in the fingerprint recognition apparatus of FIG. 1.

FIG. 3 is a cross-sectional view illustrating an exemplary structure of the fingerprint sensor 1200 employed in the pressure recognition apparatus 1000 of FIG. 1.

The fingerprint sensor 1200 includes a first electrode unit 120 including a plurality of first electrodes TXn (where n is a natural number) arranged in parallel along a direction, and a second electrode unit 140 including a plurality of second electrodes RXn (where n is a natural number) arranged in parallel along a direction intersecting, e.g., orthogonal to, the plurality of first electrodes TXn.

The first electrodes TXn and the second electrodes RXn may include a transparent conductive material (e.g., indium tin oxide (ITO), indium zinc oxide (IZO), zinc oxide (ZnO), indium oxide (In2O3), indium gallium oxide (IGO), aluminum zinc oxide (AZO), or the like). The first electrodes TXn and the second electrodes RXn may also include an organic electrode or a transparent conductive material containing nanowires, nanoparticles, or the like.

An insulating layer 130 may be placed between the first electrode unit 120 and the second electrode unit 140.

The first electrode unit 120 and the second electrode unit 140 may be provided on a transparent substrate 110. The transparent substrate 110 may be formed of a transparent plastic material or a glass material.

A protection layer 150 may be provided on the second electrode unit 140. An upper surface of the protection layer 150 may become the touch surface 150*a*, and a fingerprint FP may be input to the fingerprint sensor 1200 when the protection layer 150 is touched by a finger of a user via the touch surface 150*a*.

The fingerprint sensor 1200 may be an on-screen fingerprint sensor. In this case, the touch surface 150*a* may be arranged on a display surface of a display panel, and the user may touch a desired area on a screen image displayed on the screen. The transparent substrate 110 may be a cover glass of the display panel.

The fingerprint sensor 1200 is of a capacitance type. When the finger of the user touches the touch surface 150*a*, the fingerprint sensor 1200 senses a capacitance variation based on a detailed shape of the touched fingerprint FP. A node at which the plurality of first electrodes TXn and the plurality of second electrodes RXn intersect, respectively, may function as a pixel for sensing a fingerprint input. At the node at which the plurality of first electrodes TXn and the plurality of second electrodes RXn intersect, respectively, a self-capacitance or mutual capacitance variation occurs due to a fingerprint input, and an image of the touched fingerprint may be obtained from an electric capacitance variation at a plurality of touched nodes.

When a driving signal is applied to the first electrode unit 120, a mutual capacitance is generated between the first electrode unit 120 and the second electrode unit 140. If a finger contacts the touch surface 150*a*, a change occurs in a mutual capacitance generated between the first electrode unit 120 and electrodes positioned adjacent to an area the finger contacts from among multiple electrodes included in the second electrode unit 140. The electric capacitance variation differs from an electrode positioned adjacent to a ridge FR of the fingerprint FP of the finger to an electrode positioned adjacent to a valley FV of the fingerprint FP of the finger. A variation in a mutual capacitance based on the fingerprint FP of the finger situated adjacent to the second electrode unit 140 may be detected in each position and a fingerprint image may be computed.

Although the first electrode unit 120 functions as a driving electrode unit and the second electrode unit 140 functions as a detecting electrode unit in the foregoing description, the present exemplary embodiment is not limited to this example. That is, the second electrode unit 140 may function as a driving electrode unit and the first electrode unit 120 may function as a detecting electrode unit.

Figure 4:
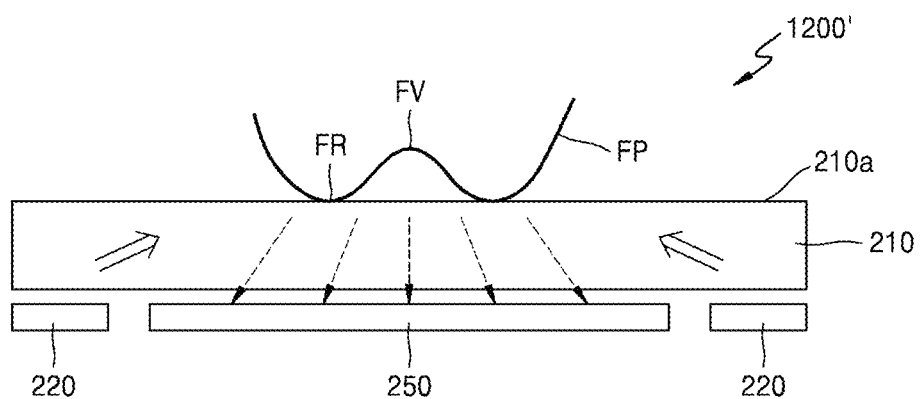
FIG. 4 is a cross-sectional view illustrating another exemplary structure of a fingerprint sensor employed in the fingerprint recognition apparatus of FIG. 1.

FIG. 4 is a cross-sectional view illustrating a structure of a fingerprint sensor 1200' according to another example that may be employed in the pressure recognition device 1000 of FIG. 1.

The fingerprint sensor 1200' is an optical type sensor, and includes a touch unit 210 including a touch surface 210*a* touchable by a finger of a user, a light source 220 that radiates light toward the touch surface 210*a*, and an image sensor 250 that senses light reflected by a fingerprint FP of the finger of the user in contact with the touch surface 210*a* to generate a fingerprint image.

The light source 220 may provide visible light toward the touch surface 210*a* so that the image sensor 250 is able to capture the fingerprint image. The arrangement of the light source 220 is only an example and thus is not limited thereto. The light source 220 may be arranged in any other way as long as the light source 220 is able to radiate light toward the touch surface 210*a*.

The touch unit 210 may be formed of a transparent plastic material or a glass material.

The fingerprint sensor 1200' may be an on-screen fingerprint sensor. In this case, the touch unit 210 may be a cover glass of a display panel.

Although two types of fingerprint sensors, namely, a capacitance type and an optical type, are illustrated above with reference to FIGS. 3 and 4, embodiments are not limited thereto, and structures capable of sensing a fingerprint according to various other methods may be employed in the pressure recognition apparatus 1000.

Figure 5:
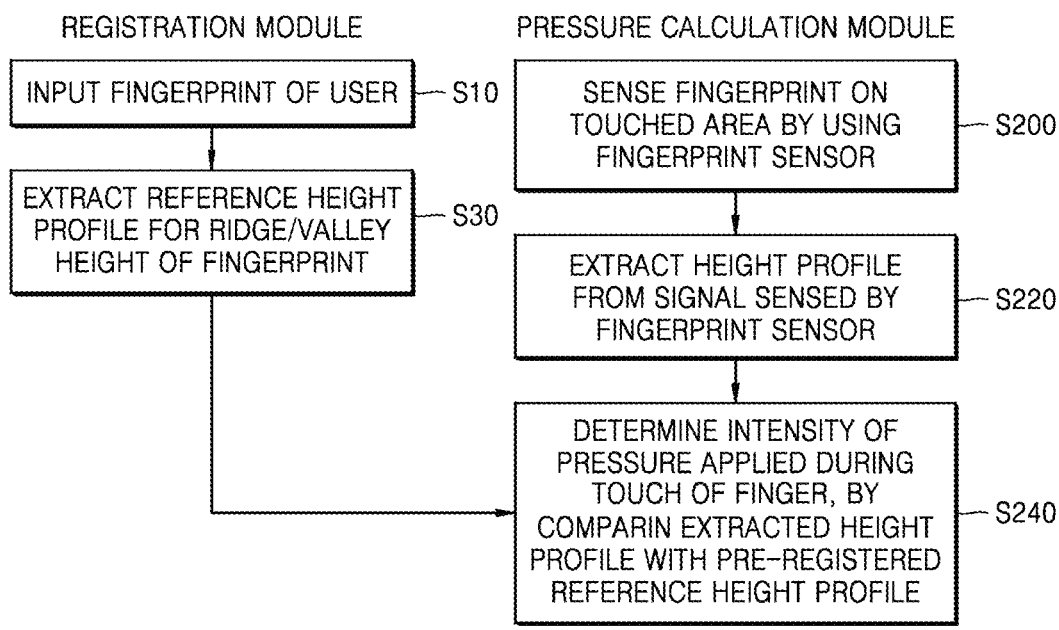
FIG. 5 is a flowchart of a pressure recognition method according to another exemplary embodiment.

FIG. 5 is a flowchart of a pressure recognition method according to another exemplary embodiment.

For pressure recognition, as described above, a pressure recognition apparatus may execute a registration module corresponding to an operation of utilizing fingerprint information of a user and extracting a reference profile from the fingerprint information, in advance. When a fingerprint of the user is input via a fingerprint sensor of the pressure recognition apparatus in operation S10, the fingerprint sensor may sense the input fingerprint to obtain the fingerprint information, and a reference height profile for a ridge/valley height of the fingerprint may be extracted from the fingerprint information, in operation S30. A plurality of reference height profiles may be extracted according to a plurality of pieces of fingerprint information about a fingerprint input in different touch states.

In a pressure calculation module, when a user applies a pressure via his or her finger, the fingerprint sensor recognizes the intensity of the pressure.

In operation S200, when a pressure is applied via a finger of a user, the fingerprint sensor senses a fingerprint on a touched area.

Next, in operation S220, the pressure recognition apparatus extracts a height profile from a signal sensed by the fingerprint sensor. The pressure recognition apparatus extracts data about a fingerprint ridge/valley height according to each position on the touched area such that the extracted data may be compared with the reference height profile.

Then, in operation S240, the pressure recognition apparatus determines the intensity of the pressure applied during the touch of the finger, by comparing the extracted height profile with the pre-stored reference height profile. At least one reference height profile may be stored according to at least one piece of fingerprint information about a fingerprint input in different touch states. The pressure recognition apparatus may calculate the intensity of the input pressure by comparing the at least one extracted height profile with the at least one pre-stored reference height profile.

Figure 6A:
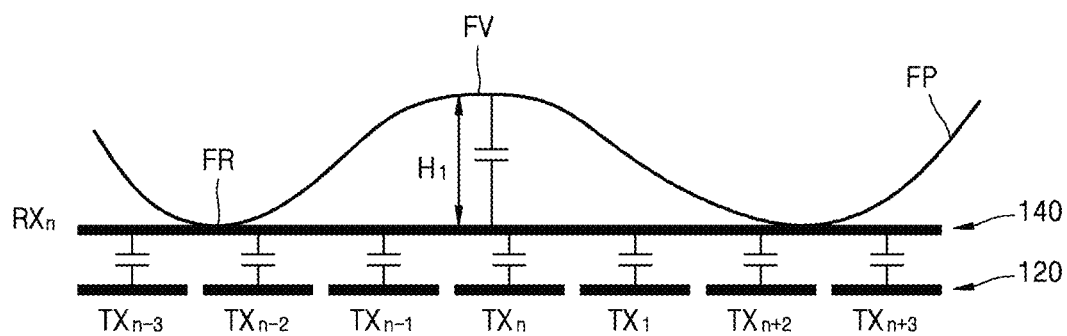
FIGS. 6A-6C are conceptual views for explaining a sensing, by a fingerprint sensor, of a ridge/valley height of a fingerprint according to pressure.
Figure 6B:
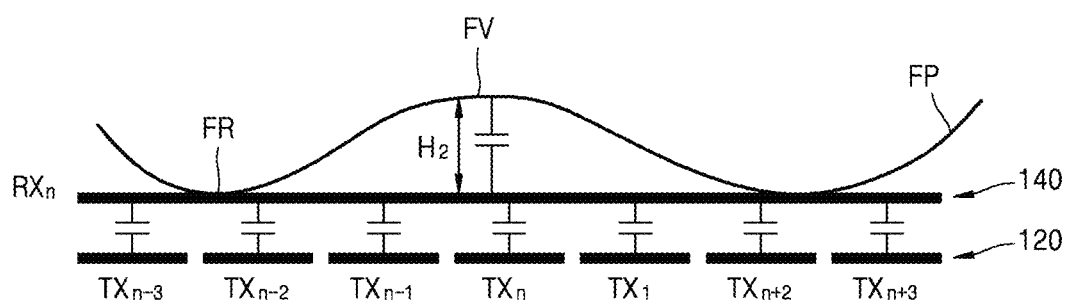
Figure 6C:
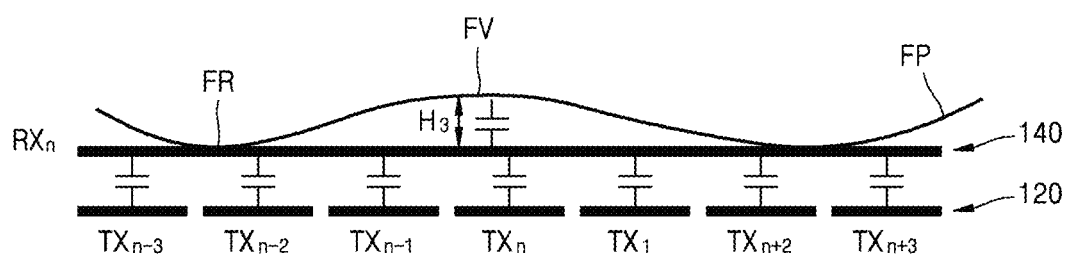

FIGS. 6A-6C are conceptual views for explaining that a finger print sensor senses a variation of the ridge/valley height of a fingerprint according to pressure.

FIGS. 6A-6C explain that a variation in the ridge/valley height of the fingerprint affects a capacitance, by using an equivalent circuit of a capacitance-type fingerprint sensor, namely, the fingerprint sensor 1200 of FIG. 1.

FIGS. 6A-6C illustrate a soft touch state, a normal touch state, and a hard touch state, respectively. The intensity of the applied pressure is the smallest in the soft touch state, and increases in the order of the normal touch state and the hard touch state.

According to touch states, a ridge/valley height difference of a fingerprint FP has a relationship of H1>H2>H3. The ridge/valley height difference, namely, a difference between heights of a ridge FR and a valley FV of the fingerprint FP, may be sensed as a difference in a capacitance, and a reference height profile to serve as a standard for a pressure intensity calculation may be extracted from a signal sensed by the fingerprint sensor.

Figure 7:
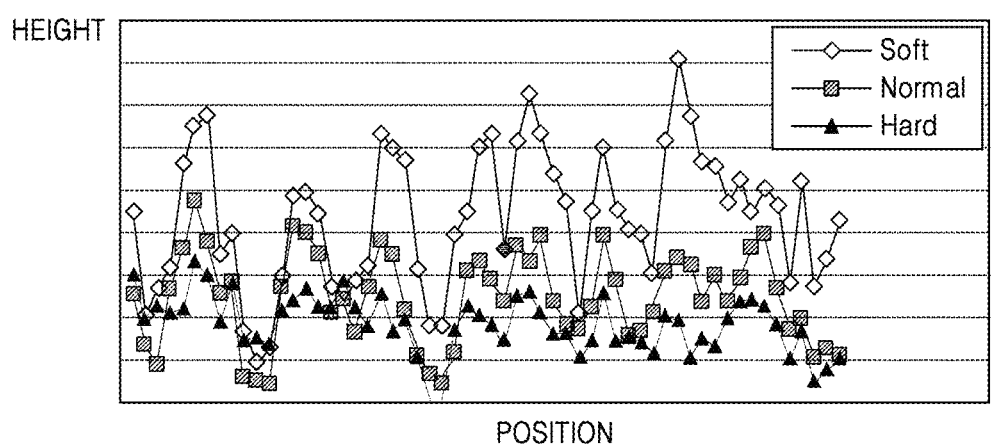
FIG. 7 is a graph showing fingerprint ridge/valley height profiles according to pressure.

FIG. 7 is a graph showing fingerprint ridge/valley height profiles according to pressure.

Ridge/valley height distributions according to soft, normal, and hard touch states are clearly distinguishable from each other, and accordingly, the intensity of an input pressure may be determined based on the ridge/valley height distributions.

Figure 8:
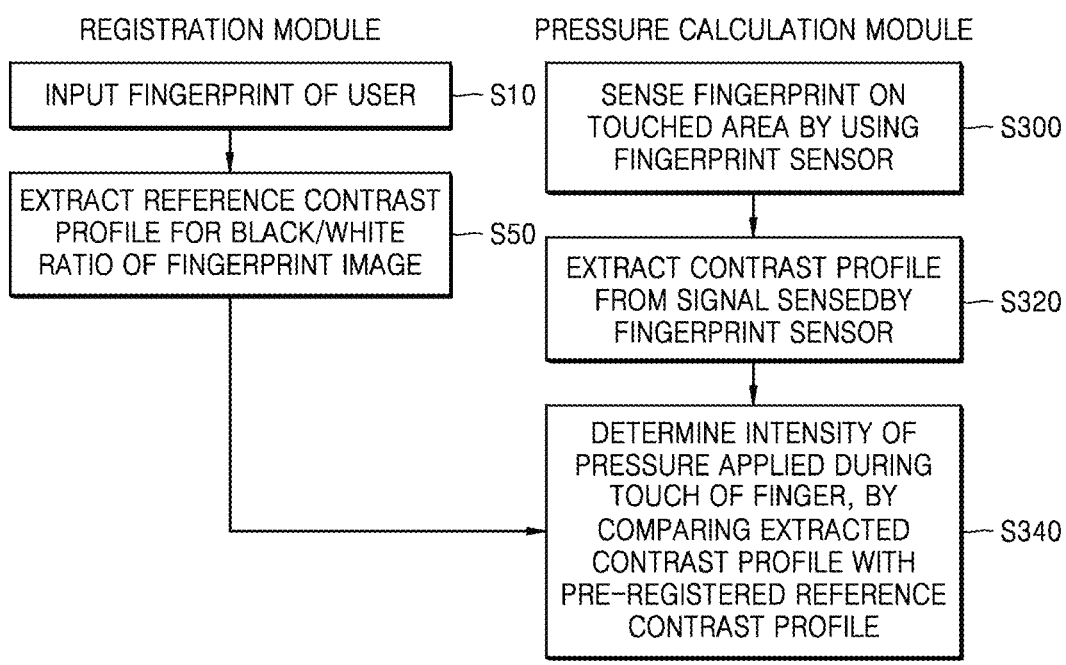
FIG. 8 is a flowchart of a pressure recognition method according to another exemplary embodiment.

FIG. 8 is a flowchart of a pressure recognition method according to another exemplary embodiment.

The pressure recognition method according to the present exemplary embodiment is different from the pressure recognition method of FIG. 5 in that a contrast profile for a black/white ratio of a fingerprint image is used as a reference.

In a registration module, when a fingerprint of a user is input via a fingerprint sensor of a pressure recognition apparatus in operation S10, the fingerprint sensor senses the input fingerprint to obtain fingerprint information, and the pressure recognition apparatus extracts a reference contrast profile for the black/white ratio of the fingerprint image from the fingerprint information, in operation S50. A plurality of reference contrast profiles may be extracted according to a plurality of pieces of fingerprint information about fingerprints input in different touch states.

In a pressure calculation module, when a user applies a pressure via his or her finger, the fingerprint sensor recognizes the intensity of the pressure.

In operation S300, when a pressure is applied via the finger, the fingerprint sensor senses a fingerprint on a touched area.

Next, in operation S320, the pressure recognition apparatus extracts a contrast profile from a signal sensed by the fingerprint sensor. The pressure recognition apparatus extracts a contrast shown on the fingerprint image with respect to the touched area such that the extracted contrast may be compared with the reference contrast profile.

Then, in operation S340, the pressure recognition apparatus determines the intensity of the touched pressure by comparing the extracted contrast profile with the pre-stored reference contrast profile. At least one reference contrast profile may be stored according to at least one piece of fingerprint information about fingerprints input in different touch states. The pressure recognition apparatus may calculate the intensity of the input pressure by comparing at least one extracted contrast profile with the at least one pre-stored reference contrast profile.

Figure 9A:
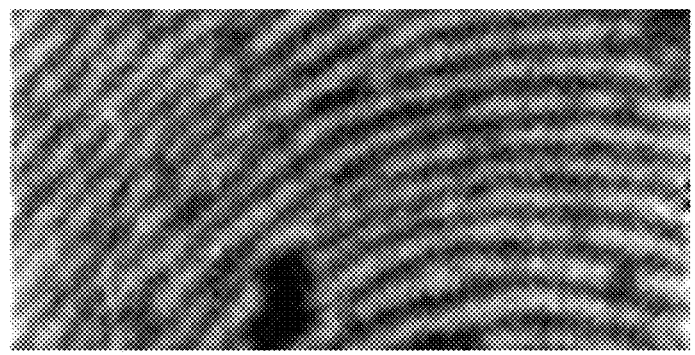
FIGS. 9A-9C illustrate a variation in the contrast of a fingerprint image according to pressure.
Figure 9B:
Figure 9C:

FIGS. 9A-9C illustrate a variation in the contrast of a fingerprint image according to pressures.

FIGS. 9A-9C illustrate fingerprint images corresponding to a soft touch state, a normal touch state, and a hard touch state, respectively. The intensity of an applied pressure is the smallest in the soft touch state, and increases in the order of the normal touch state and the hard touch state. A ridge/valley height difference of the resultant fingerprint increases as the applied pressure decreases, and the contrast is highest in an image with a large ridge/valley height difference. The contrast is the highest in the soft touch state in which the applied pressure is the smallest, and the contrast is the lowest in the hard touch state in which the applied pressure is the largest.

The fingerprint image may be obtained by converting data about a difference in a capacitance into image data or by directly photographing a touched fingerprint, and a reference contrast profile, used as a basis for the pressure intensity calculation, may be extracted from the fingerprint image.

In the above description of the pressure recognition method, extracting a ridge/valley height difference of a fingerprint and a contrast shown on a fingerprint image has been described as one example of utilizing a fingerprint sensor and extracting a feature profile from a sensed signal. The method of extracting the ridge/valley height difference of the fingerprint may be a preferred method when a capacitance type fingerprint sensor is used, and the method of extracting the contrast of the fingerprint image may be the preferred method when an optical type fingerprint sensor, that directly photographs a fingerprint pattern, is used, but exemplary embodiments are not limited thereto.

The above-described pressure recognition apparatus may be employed in any of various electronic apparatuses, for example, an electronic apparatus including a fingerprint sensor and may be used in conjunction with any of various applications using a pressure intensity as an input.

Figure 10:
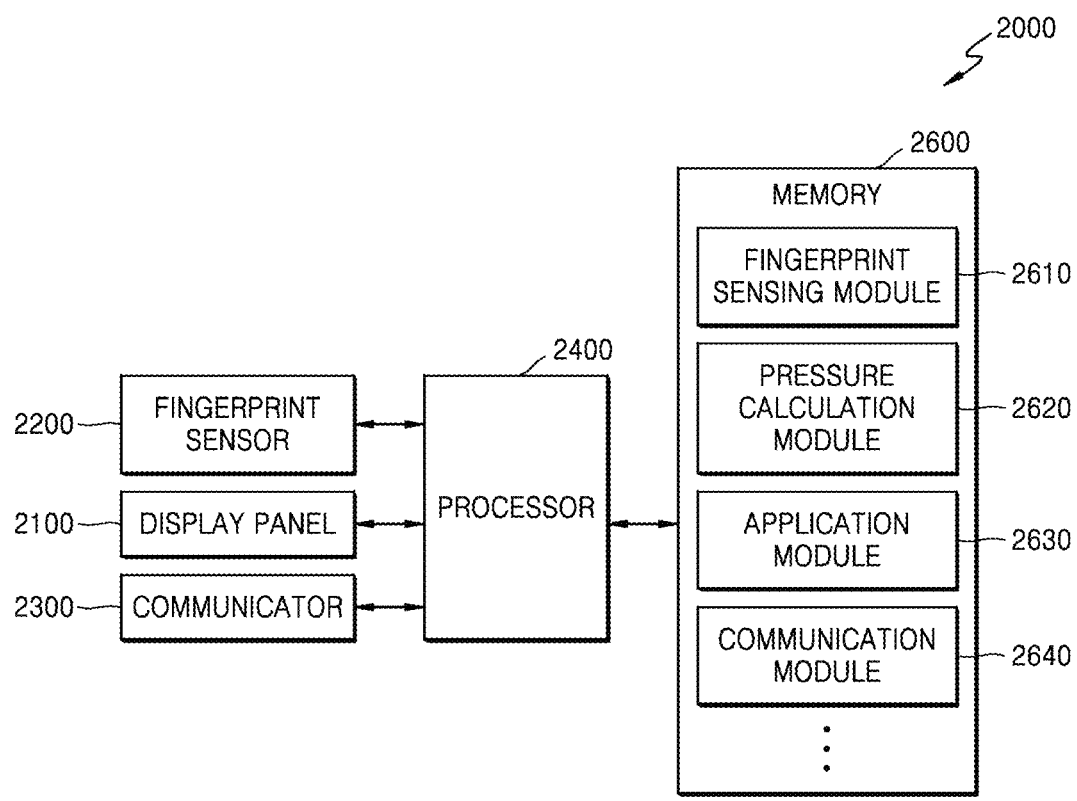
FIG. 10 is a schematic block diagram of a structure of an electronic apparatus according to an exemplary embodiment.

FIG. 10 is a schematic block diagram of a structure of an electronic apparatus 2000 according to an exemplary embodiment.

The electronic apparatus 2000 may be, for example, a smartphone, a smart watch, or another type of portable mobile communication device.

The electronic apparatus 2000 may include a fingerprint sensor 2200, a display panel 2100, and a processor 2400 for controlling the fingerprint sensor 2200 and the display panel 2100. The electronic apparatus 2000 may also include a communicator 2300 and a memory 2600.

Fingerprint sensors having any of various structures that include a touch surface touched by a user and sense a fingerprint of the user input to the touch surface may be employed as the fingerprint sensor 2200. The aforementioned capacitance type fingerprint sensor or the aforementioned optical type fingerprint sensor may be used, but exemplary embodiments are not limited thereto.

The memory 2600 may store a program for processing and controlling the processor 2400.

The memory 2600 may store an application module 2630 that uses the intensity of a pressure input by the user as a parameter, and a pressure calculation module 2620 that calculates the intensity of a pressure applied to the touch surface from a signal sensed by the fingerprint sensor 2200.

The memory 2600 may store data usable for executing the pressure calculation module 2620, for example, stored fingerprint information of the user. The memory 2600 may store a reference height profile for extracting a ridge/valley height distribution of the fingerprint of the user from the fingerprint information of the user, or a reference contrast profile for extracting the contrast of a fingerprint image from the fingerprint information of the user.

The pressure calculation module 2620 may extract a height profile representing a ridge/valley height distribution of the fingerprint from the signal sensed by the fingerprint sensor 2200, and may include commands for comparing the height profile with the reference height profile stored in the memory 2600.

Alternatively, the pressure calculation module 2620 may extract a contrast profile of the fingerprint image from the signal sensed by the fingerprint sensor 2200, and may include commands for comparing the contrast profile with the reference contrast profile stored in the memory 2600.

In addition, the memory 2600 may store a fingerprint sensing module 2610 for recognizing and authenticating the fingerprint of the user, and a communication module 2640 for communication. The memory 2600 may further store a module for any of various applications that are to be performed by electronic apparatus 2000. According to devices included in the electronic apparatus 2000, the memory 2600 may further store a camera module, a moving picture reproduction module, an audio reproduction module, and the like as programs for driving such devices.

The memory 2600 may include at least one type of storage medium from among a flash memory type storage medium, a hard disk type storage medium, a multimedia card micro type storage medium, a card type memory (for example, Secure Digital (SD) or eXtreme Digital (XD) memory), a random access memory (RAM), a static RAM (SRAM), a read-only memory (ROM), an electrically erasable programmable ROM (EEPROM), a programmable ROM (PROM), a magnetic memory, a magnetic disk, and an optical disk, or other memory.

The display panel 2100 may be controlled by the processor 2400 and may provide an execution screen of the application module 2630. The display panel 2100 may be, but is not limited to, an organic light-emitting display panel or a liquid crystal display panel.

The display panel 2100 may be integrally formed with the fingerprint sensor 2200, and a touch surface of the fingerprint sensor 2200 may be provided on a display surface of the display panel 2100 to provide an on-screen touch surface.

The processor 2400 may control and process the entire electronic apparatus 2000. The processor 2400 may recognize a pressure input to the touch surface of the fingerprint sensor 2200, as described above, by executing the program stored in the memory 2600, for example, by executing the pressure calculation module 2620. For example, according to input pressure intensities, execution or non-execution of the application module 2630 may be determined, or commands corresponding to the input pressure intensities may be executed.

The communicator 2300 may communicate with an external apparatus by using, for example, Bluetooth communication, Bluetooth Low Energy (BLE) communication, Near Field Communication unit, WLAN (Wi-Fi) communication, Zigbee communication, infrared Data Association (IrDA) communication, Wi-Fi Direct (WFD) communication, ultra wideband (UWB) communication, Ant+ communication, WIFI communication, or other wireless communication or hard-wired communication.

Figure 11:
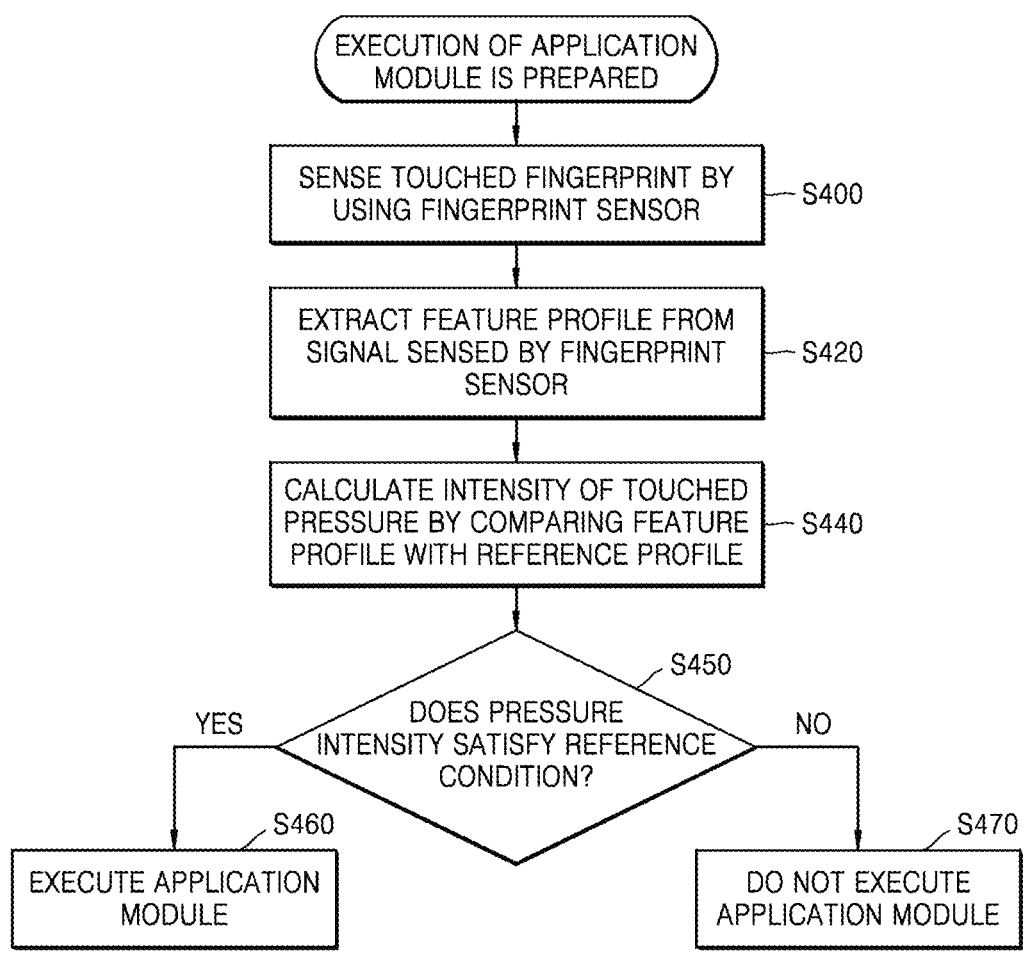
FIG. 11 is a flowchart of a process in which the electronic apparatus of FIG. 10 executes an application module via pressure recognition.

FIG. 11 is a flowchart of a process in which the electronic apparatus 2000 of FIG. 10 executes an application module via pressure recognition.

When execution of an application module via pressure recognition is prepared, the fingerprint sensor 2200 senses a touched fingerprint, in operation S400. Next, the electronic apparatus 2000 extracts a feature profile from a signal sensed by the fingerprint sensor 2200, in operation S420.

The feature profile may be a profile for a fingerprint ridge/valley height or a profile for a contrast of a fingerprint image.

Then, in operation S440, the pressure recognition apparatus 2000 calculates the intensity of a touched pressure by comparing the feature profile with a reference profile.

When the pressure intensity is calculated, the pressure recognition apparatus 2000 determines whether the pressure intensity satisfies a reference condition, to execute the application module, in operation S450. For example, the pressure recognition apparatus 2000 may determine whether the pressure intensity is not less than a reference value.

When the pressure intensity is not less than the reference value, a touched command, namely, the application module, is executed, in operation S460. Otherwise, the application module is not executed, in operation S470.

Figure 12:
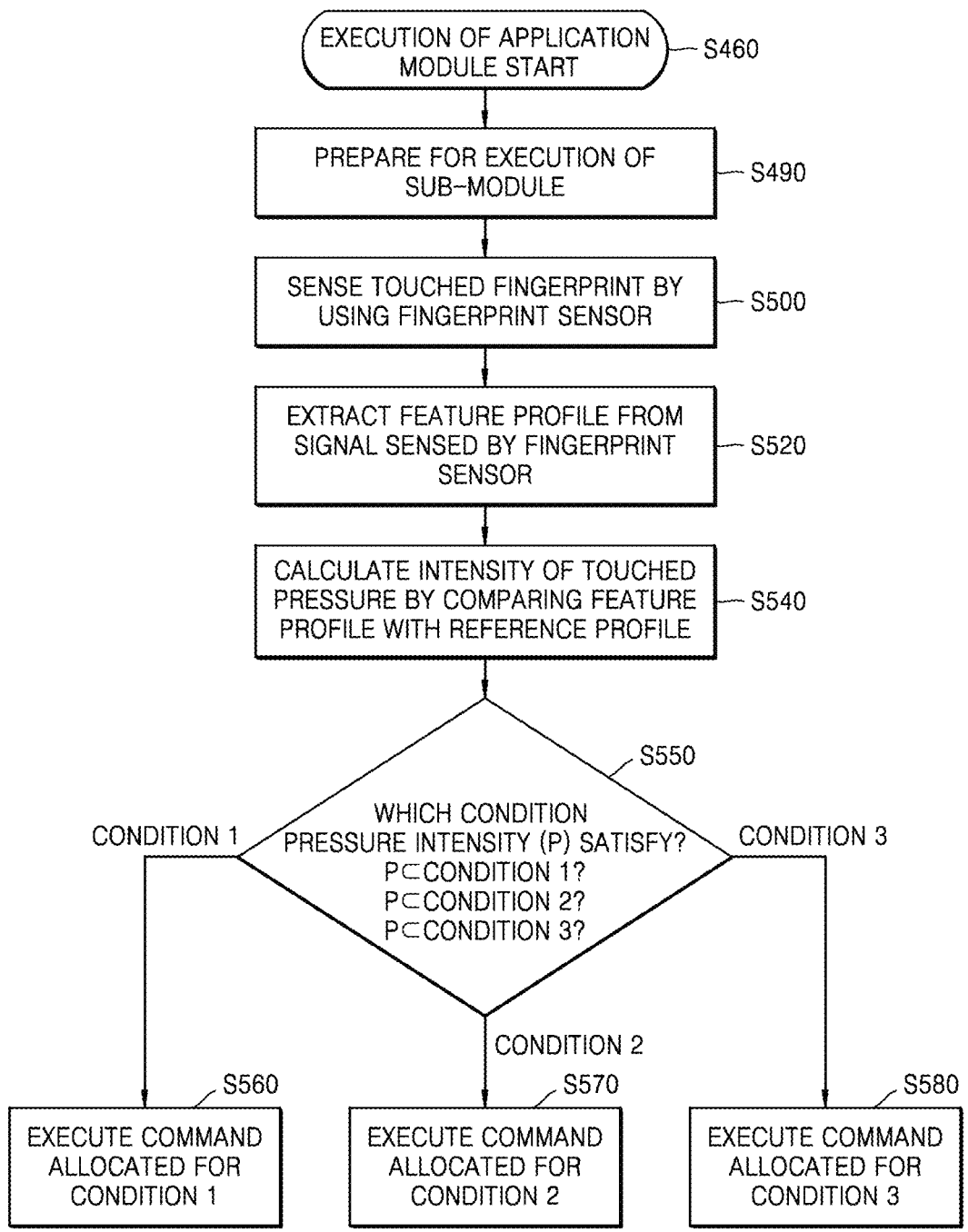
FIG. 12 is a flowchart of another process in which the electronic apparatus of FIG. 10 executes an application module via pressure recognition.

FIG. 12 is a flowchart of another process in which the electronic apparatus 2000 of FIG. 10 executes an application module via pressure recognition.

In operation S460, the application module starts being executed. Execution of a sub-module within the application module may be prepared in operation S490. In other words, the application module may include a sub-module including commands that are executed according to conditions of pressure intensity. To execute this sub-module, a pressure may be input.

After execution of the sub-module is prepared in operation S490, the fingerprint sensor 2200 senses a touched fingerprint to execute the sub-module, in operation S500.

Next, in operation S520, the electronic apparatus 2000 extracts a feature profile from a signal sensed by the fingerprint sensor 2200. The feature profile may be a profile for a fingerprint ridge/valley height or a profile for a contrast of a fingerprint image.

Then, in operation S540, the pressure recognition apparatus 2000 calculates the intensity of a touched pressure by comparing the feature profile with a reference profile.

When the pressure intensity is calculated, the pressure recognition apparatus 2000 determines which condition the pressure intensity satisfies, to execute a certain command within the sub-module, in operation S550. In other words, the pressure recognition apparatus 2000 determines which condition a pressure intensity P satisfies from among conditions 1, 2, and 3.

When the pressure intensity P satisfies the condition 1, a command allocated for the condition 1 is executed, in operation S560. When the pressure intensity P satisfies the condition 2, a command allocated for the condition 2 is executed, in operation S570. When the pressure intensity P satisfies the condition 3, a command allocated for the condition 3 is executed, in operation S580.

FIGS. 11 and 12 illustrate processes of executing an application module via pressure recognition, and various other applications are possible.

The apparatuses described herein may include a processor, a memory for storing program data and executing it, a permanent storage unit such as a disk drive, a communications port for handling communications with external devices, and user interface devices, including a touch panel, keys, buttons, etc.

When software modules or algorithms are involved, these software modules may be stored as program instructions or computer readable codes executable on a processor on a computer-readable recording medium. Examples of the computer-readable recording medium include magnetic storage media (e.g., ROM, floppy disks, hard disks, etc.), and optical recording media (e.g., CD-ROMs, or digital versatile discs (DVDs)). The computer-readable recording medium can be distributed over network coupled computer systems so that the computer-readable code is stored and executed in a distributive manner. This media can be read by the computer, stored in the memory, and executed by the processor.

The particular implementations shown and described herein are illustrative examples of the inventive concept and are not intended to otherwise limit the scope of the inventive concept in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

The above-described pressure recognition apparatuses are able to recognize an applied pressure by using fingerprint sensors, and thus do not need separate pressure sensors.

The above-described pressure recognition apparatuses are applicable to any of various electronic apparatuses including fingerprint sensors, and may be utilized by an application that uses a pressure as an input.

Although a pressure recognition apparatus and an electronic apparatus including the same according to the inventive concept have been described above with reference to the exemplary embodiments illustrated in the drawings, the illustrated embodiments are only examples, and various modifications to the illustrated embodiments and other equivalent embodiments may be possible. It should be understood that exemplary embodiments described herein should be considered in a descriptive sense only and not for purposes of limitation. The scope of the inventive concept is defined not by the detailed description of the inventive concept but by the appended claims, and all differences within the scope will be construed as being included in the inventive concept.

What is claimed is:

1. A pressure recognition apparatus comprising:
  a fingerprint sensor comprising a touch surface touchable by a user, the fingerprint sensor being configured to sense information about a fingerprint of the user input to the touch surface; and
  a processor configured to;
    extract, from sensed fingerprint information, a feature profile of the fingerprint;
    extract, from a reference fingerprint information, a reference profile representing a feature of the fingerprint of the user; and
    determine an intensity of pressure applied to the touch surface based on a comparison of the feature profile with the reference profile.

2. The pressure recognition apparatus of claim 1, further comprising a memory,
  wherein the reference fingerprint information of the user is stored in the memory.

3. The pressure recognition apparatus of claim 1, wherein the reference profile is a reference height profile comprising a reference ridge/valley height distribution of the fingerprint of the user.

4. The pressure recognition apparatus of claim 3, wherein the processor is further configured to extract, from the reference fingerprint information, a plurality of reference height profiles respectively matched with touch states.

5. The pressure recognition apparatus of claim 3, wherein the feature profile is a height profile comprising a sensed ridge/valley height distribution of the fingerprint of the user.

6. The pressure recognition apparatus of claim 5, wherein the processor is configured to calculate the intensity of the pressure applied to the touch surface based on a comparison of the reference height profile and the height profile.

7. The pressure recognition apparatus of claim 1, wherein the reference profile is a reference contrast profile comprising a contrast, representing a ratio between black and white, of a fingerprint image of the fingerprint of the user.

8. The pressure recognition apparatus of claim 7, wherein the processor is further configured to extract, from the reference fingerprint information, a plurality of reference contrast profiles respectively matched with touch states.

9. The pressure recognition apparatus of claim 7, wherein the feature profile is a contrast profile of the fingerprint image.

10. The pressure recognition apparatus of claim 9, wherein the processor is configured to calculate the intensity of the pressure applied to the touch surface based on a comparison of the reference contrast profile and the contrast profile.

11. The pressure recognition apparatus of claim 1, wherein the fingerprint sensor is a capacitance-type sensor.

12. The pressure recognition apparatus of claim 1, wherein the fingerprint sensor is an optical sensor.

13. The pressure recognition apparatus of claim 1, wherein the processor is further configured to determine the intensity of pressure applied to the touch surface based on a comparison of the feature profile with the reference profile, and
  wherein, based on one of a plurality of preset conditions of the intensity of pressure being satisfied, the plurality of preset conditions being allocated with respective commands, the processor is further configured to execute a command allocated to the one of the plurality of preset conditions of the intensity of pressure.

14. An electronic apparatus comprising:
  a fingerprint sensor comprising a touch surface touchable by a user, the fingerprint sensor being configured to sense information about a fingerprint of the user input to the touch surface;
  a memory configured to store an application module that uses an intensity of a pressure input by the user as a parameter, and a pressure calculation module that extracts, from sensed fingerprint information, a feature profile of an image of the fingerprint; extracts, from a reference fingerprint information, a reference profile representing a feature of the fingerprint of the user; and calculates the intensity of a pressure applied to the touch surface based on a comparison of the feature profile with the reference profile; and
  a processor configured to execute the application module and the pressure calculation module.

15. The electronic apparatus of claim 14, further comprising a display panel controlled by the processor and configured to provide an execution screen of the application module.

16. The electronic apparatus of claim 15, wherein the touch surface of the fingerprint sensor is disposed on a display surface of the display panel.

17. The electronic apparatus of claim 14, wherein the reference fingerprint information of the user is stored in the memory.

18. The electronic apparatus of claim 17, wherein the memory further stores a reference height profile comprising a reference ridge/valley height distribution of the fingerprint of the user.

19. The electronic apparatus of claim 18, wherein the pressure calculation module comprises command for extracting, from the sensed fingerprint information, a height profile comprising a sensed ridge/valley height distribution of the fingerprint of the user and comparing the reference height profile with the height profile.

20. The electronic apparatus of claim 17, wherein the memory is further configured to store a reference contrast profile comprising a contrast of a fingerprint image.

21. The electronic apparatus of claim 20, wherein the pressure calculation module comprises command for extracting, from the sensed fingerprint information, a contrast profile of the fingerprint image and comparing the reference contrast profile with the contrast profile.

* * * * *